United States Patent
Miyazaki (10) Patent No.: US 9,567,454 B2
(45) Date of Patent: Feb. 14, 2017

(54) TIRE INNER-LAYER RUBBER COMPOSITION AND PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 200 days.

(21) Appl. No.: 14/368,110

(22) PCT Filed: Oct. 18, 2012

(86) PCT No.: PCT/JP2012/076920
§ 371 (c)(1),
(2) Date: Jun. 23, 2014

(87) PCT Pub. No.: WO2013/108454
PCT Pub. Date: Jul. 25, 2013

(65) Prior Publication Data
US 2014/0367009 A1 Dec. 18, 2014

(30) Foreign Application Priority Data

Jan. 20, 2012 (JP) ................................. 2012-010430
Oct. 3, 2012 (JP) ................................. 2012-221539

(51) Int. Cl.
*B60C 1/00* (2006.01)
*C08L 7/00* (2006.01)

(52) U.S. Cl.
CPC ................ *C08L 7/00* (2013.01); *B60C 1/0008* (2013.04); *B60C 1/0016* (2013.04);
(Continued)

(58) Field of Classification Search
CPC ........ B60C 1/00; B60C 1/0008; B60C 1/0016; B60C 1/0041; B60C 2001/0066; B60C 2001/0033; B60C 2001/0083; B60C 11/0025; B60C 11/0008; B60C 2011/0016; B60C 2011/0033; B60C 11/0041; B60C 11/005; B60C 11/00; B60C 9/02; B60C 2009/0269; B60C 2013/005; B60C 2013/007; C08L 15/00; C08L 9/06; C08L 91/06; C08L 7/00; C08K 5/01
(Continued)

(56) References Cited

U.S. PATENT DOCUMENTS

| 5,088,537 A * | 2/1992 | Kan ...................... B60C 1/0025 152/525 |
| 2006/0174987 A1* | 8/2006 | Hirayama ............... B60C 11/00 152/209.5 |

(Continued)

FOREIGN PATENT DOCUMENTS

| CN | 101100533 A | 1/2008 |
| CN | 102093605 A | 6/2011 |

(Continued)

OTHER PUBLICATIONS

Ludwig, F. John, Analysis of Microcrystalline Waxes by Gas-Liquid Chromatography, Analytical Chemistry, vol. 37, No. 13, Dec. 1965, pp. 1732-1737.*

(Continued)

*Primary Examiner* — Eric Hug
(74) *Attorney, Agent, or Firm* — Birch, Stewart, Kolasch & Birch, LLP (57) ABSTRACT

The invention provides rubber compositions for tire inner layers, capable of providing excellent ozone resistance over a wide environmental temperature range and of preventing discoloration well, as well as pneumatic tires including such compositions. The invention relates to a rubber composition for tire inner layers, containing C20-C32 normal alkanes.

(Continued)

Preferably, the combined amount of the C20-C32 normal alkanes is 0.1-2.5 parts by mass, and the combined amount of phenylenediamine and quinone antioxidants is 0-4 parts by mass, each per 100 parts by mass of the diene rubber component. The rubber composition for tire inner layers preferably contains C48 and higher normal alkanes in a combined amount of not more than 0.1 parts by mass per 100 parts by mass of the diene rubber component. The rubber composition preferably contains not more than 15 parts by mass of process oil per 100 parts by mass of the diene rubber component.

8 Claims, 1 Drawing Sheet (52) U.S. Cl.
CPC .... *B60C 1/0041* (2013.04); *B60C 2001/0066* (2013.04); *C08L 2205/02* (2013.01); *C08L 2205/03* (2013.01); *Y02T 10/862* (2013.01)

(58) Field of Classification Search
USPC .......... 152/209.1, 209.5, 905; 523/152, 156; 524/487
See application file for complete search history.

(56) References Cited

U.S. PATENT DOCUMENTS

| | | | |
|---|---|---|---|
| 2010/0163150 A1 | 7/2010 | Hirayama et al. | |
| 2011/0094648 A1* | 4/2011 | Horiguchi | B29D 30/72 152/525 |
| 2011/0136961 A1 | 6/2011 | Hattori et al. | |

FOREIGN PATENT DOCUMENTS

| | | | |
|---|---|---|---|
| JP | 2007-182100 A | | 7/2007 |
| JP | 2008-308518 A | | 12/2008 |
| JP | 2011-116847 A | | 6/2011 |
| JP | 2011-140612 A | | 7/2011 |
| KR | 2002-0009992 | * | 2/2002 |

OTHER PUBLICATIONS

Reid, W. K., Use of High Resolution Mass Spectrometry in the Study of Petroleum Waxes, Microcrystalline Waxes, and Ozokerite, Analytical Chemistry, vol. 38, No. 3, Mar. 1966, pp. 445-449.*
English machine translation of JP-2007-182100-A dated Jul. 19, 2007.
English machine translation of JP-2011-116847-A dated Jun. 16, 2011.
International Search Report, mailed Nov. 27, 2012, issued in PCT/JP2012/076920.

* cited by examiner

TIRE INNER-LAYER RUBBER COMPOSITION AND PNEUMATIC TIRE

TECHNICAL FIELD

The present invention relates to rubber compositions for tire inner layers and pneumatic tires including such compositions.

BACKGROUND ART

Rubber compositions for tire treads, tire sidewalls or the like contain wax or other additives for preventing degradation by ozone or by oxidation. The added wax migrates to the rubber surface to form a film on the rubber surface, which physically protects rubber from physical stimuli of ozone, oxygen, and other harmful gases.

In cold to temperate regions, wax blooming is less likely to occur, which makes it difficult to ensure ozone resistance. Thus, the use of conventional wax in an amount that allows prevention of discoloration may result in insufficient ozone resistance in cold environments (for example, in winter in the temperate regions). In hot regions, on the other hand, wax blooming is likely to occur because rubber molecules are in active motion. This facilitates ensuring ozone resistance but easily causes the surface of tires to turn white. Therefore, it is difficult to provide excellent ozone resistance over a wide temperature range from intense-cold to tropical zones while preventing white discoloration.

In particular, silica-containing tread rubbers are likely to be attacked by ozone because the rubbers are likely to shrink by vulcanization so that tension is applied to the bottom of the tread grooves. Accordingly, tread groove cracking (TGC) is likely to occur. Thus, it is important to ensure both ozone resistance and discoloration resistance.

Another known approach for improving ozone resistance is to use the antioxidant 3PPD, which tends to migrate quickly to the surface. This agent is capable of improving ozone resistance in cold environments because it easily blooms as compared to 6PPD or 6QDI. However, it is difficult for this agent to ensure ozone resistance for a long period of time because it is highly volatile and will disappear in a short time.

Patent Literature 1 proposes the use of a certain wax. This method, however, has much room for improvement in terms of ozone resistance in cold regions or in winter in the temperate regions. Therefore, there remains a need for techniques that can provide excellent ozone resistance over a wide temperature range while preventing discoloration.

Meanwhile, in the case of inner layer components of tires, for example, a technique for a base tread is known which uses wax in an amount equal to that used for a cap tread, and an antioxidant in an amount equal to or more than that used for the cap tread. They are used to prevent tread groove cracking (TGC) as TGC is likely to occur in markets when the minimum rubber thickness at the groove bottom subtread is approximately 2.0 to 4 mm so that the grooves gape greatly (i.e. high tensile stress is applied to the bottom of the grooves) upon inflation.

The recent trend, driven by the growing need for lightweight tires, has been towards improving process capability, such as the precision of the weight/profile of rubber applied, the precision of the application position, and roundness, to further thin the subtread and sidewall layers. With the advances in production technology, the preparation of thin treads or sidewalls, which is conventionally impossible due to manufacturing defects, is being enabled. The preparation of thinner outer layer components has made us aware of the importance of antioxidants and waxes in inner-layer rubber components because the problems then arise that would not arise in outer rubber layers that are sufficiently thick (approximately 3 to 6 mm) since, in this case, the outer-layer rubber compounds make overwhelming contributions against cracks on the surface of the outer rubber layers.

Outer rubber layers containing much wax, in the fresh condition, are likely to turn white due to wax blooming. Wax is mainly formed of normal alkanes —$(CH_2)$ (molecular weight: 14), and has a molecular weight of approximately 420 [=(number of repeating alkane units) (=30)×(unit molecular weight) (=14)], which is approximately equivalent to that of the process oil TDAE. Thus, its migration rate to adjacent rubbers can be considered to be equivalent to that of oil. So far, however, the migration of wax has been considered only for base treads. Thus, when thinner outer rubber layers are used, a sufficient amount of wax cannot be ensured on the surface of the outer rubber layers in the fresh condition and during service, which leads to the problems that sufficient static ozone resistance and brown discoloration resistance cannot be ensured.

CITATION LIST

Patent Literature

Patent Literature 1: JP 2011-116847 A

SUMMARY OF INVENTION

Technical Problem

An object of the present invention is to provide rubber compositions for tire inner layers, capable of solving the above problems to provide excellent ozone resistance over a wide environmental temperature range and prevent discoloration well, as well as pneumatic tires including such compositions.

Solution to Problem

The present invention relates to a rubber composition for tire inner layers, containing C20 to C32 normal alkanes.

In a preferred embodiment of the rubber composition for tire inner layers, a combined amount of the C20 to C32 normal alkanes is 0.1 to 2.5 parts by mass, and a combined amount of phenylenediamine and quinone antioxidants is 0 to 4 parts by mass, each per 100 parts by mass of a diene rubber component of the rubber composition. The rubber composition for tire inner layers preferably contains C48 and higher normal alkanes in a combined amount of not more than 0.1 parts by mass per 100 parts by mass of the diene rubber component. The rubber composition preferably contains not more than 15 parts by mass of process oil per 100 parts by mass of the diene rubber component.

The rubber composition for tire inner layers is preferably for use in carcass toppings, breaker toppings, band toppings, base treads, sidewall packings, or inner sidewall layers.

The present invention also relates to a pneumatic tire, formed from the rubber composition. The present invention further relates to a pneumatic tire, including: a carcass topping including the rubber composition; and sidewalls each having a thickness of 1.0 to 2.5 mm, and to a pneumatic tire, including a base tread including the rubber composition, the pneumatic tire having a minimum rubber thickness at a tread groove bottom subtread of 1.0 to 2.5 mm.

Advantageous Effects of Invention

The present invention provides rubber compositions for tire inner layers, such as carcasses, breakers, bands, base treads, sidewall packings, and inner sidewall layers, that are capable of providing excellent ozone resistance over a wide environmental temperature range and of preventing discoloration well because they contain C20 to C32 normal alkanes.

DESCRIPTION OF EMBODIMENTS

The rubber compositions for tire inner layers of the present invention contain C20 to C32 normal alkanes.

The rubber compositions of the present invention are for use in inner layer components of tires, such as carcass toppings, breaker toppings, band toppings, base treads, sidewall packings, or inner sidewall layers.

Examples of materials that can be used as the diene rubber component in the rubber composition of the present invention include natural rubber (NR), highly purified natural rubber (highly purified NR), epoxidized natural rubber (ENR), polybutadiene rubber (BR), styrene-butadiene rubber (SBR), polyisoprene rubber (IR), acrylonitrile-butadiene rubber (NBR), styrene-isoprene-butadiene rubber (SIBR), styrene-isoprene rubber, and isoprene-butadiene rubber. These may be used either alone or in combinations of two or more. In particular, for use in carcass toppings, NR, SBR, and BR are preferred as they are advantageous in terms of processability, reversion resistance, and fuel economy. For use in breaker toppings, NR is preferred as it is advantageous in terms of elongation at break and steering response. For use in band toppings, NR and BR are preferred as they are advantageous in terms of processability and reversion resistance. For use in base treads, NR or BR is preferred as they are advantageous in terms of crack growth resistance and fuel economy. To place additional emphasis on steering response and reversion resistance in base treads, SBR may also be used. For use in inner sidewall layers, a blend of NR and BR is preferred as it is advantageous in terms of crack growth resistance and handling stability.

Examples of SBR include, but not limited to, non-modified SBR and SBRs modified with conventional modifiers (modified SBRs).

The SBR preferably has abound styrene content of not less than 10% by mass, more preferably not less than 20% by mass, in terms of improving grip performance. Also, in terms of improving abrasion resistance, the content is preferably not more than 45% by mass, and more preferably not more than 40% by mass.

The styrene content of SBR in the present invention is calculated by $H^1$-NMR analysis.

When the rubber composition of the present invention is used in carcass toppings, the SBR content based on 100% by mass of the diene rubber component is preferably not less than 10% by mass, and more preferably not less than 20% by mass. Less than 10% by mass of SBR tends to be disadvantageous in terms of reversion resistance. The content is preferably not more than 45% by mass, and more preferably not more than 35% by mass. More than 45% by mass of SBR tends to result in lower fuel economy.

When the rubber composition of the present invention is used in band toppings, the SBR content based on 100% by mass of the diene rubber component is preferably not less than 15% by mass, and more preferably not less than 20% by mass. Less than 15% by mass of SBR tends to be disadvantageous in terms of reversion resistance. The content is preferably not more than 40% by mass, and more preferably not more than 35% by mass. More than 40% by mass of SBR tends to be disadvantageous in terms of fuel economy and heat build-up.

Examples of BR include, but not limited to, BR with a cis content of 95 mol % or more (high cis BR) and tin-modified BR.

When the rubber composition of the present invention is used in base treads, the BR content based on 100% by mass of the diene rubber component is preferably not less than 10% by mass, and more preferably not less than 20% by mass. Less than 10% by mass of BR tends to allow cracks to easily grow. The content is preferably not more than 50% by mass, and more preferably not more than 35% by mass. More than 50% by mass of BR tends to result in lower elongation at break.

When the rubber composition of the present invention is used in carcass toppings, the BR content based on 100% by mass of the diene rubber component is preferably not less than 0% by mass, and more preferably not less than 10% by mass. The content is preferably not more than 40% by mass, and more preferably not more than 25% by mass. More than 40% by mass of BR tends to result in lower elongation at break.

Examples of NR include, but not limited to, those commonly used in the tire industry, such as SIR20, RSS#3, TSR20, and ENR25. Examples of IR include, but not limited to, those commonly used in the tire industry.

When the rubber composition of the present invention is used in base treads, the combined content of NR and IR based on 100% by mass of the diene rubber component is preferably not less than 50% by mass, and more preferably not less than 65% by mass. Less than 50% by mass may not provide sufficient mechanical strength. The combined content is preferably not more than 90% by mass, and more preferably not more than 85% by mass. More than 90% by mass tends to cause reversion and to allow cracks to easily grow.

When the rubber composition of the present invention is used in carcass toppings, the combined content of NR and IR based on 100% by mass of the diene rubber component is preferably not less than 40% by mass, and more preferably not less than 50% by mass. Less than 40% by mass may not provide sufficient mechanical strength. The combined content is preferably not more than 80% by mass, and more preferably not more than 70% by mass. More than 80% by mass tends to cause reversion and to result in lower fuel economy; in addition, in the case of tires for trucks and buses (e.g. tires with 100% by mass of NR), for instance, such an amount may require setting the temperature of the die during vulcanization to not higher than 155° C. (e.g. 135 to 155° C.) to prevent reversion.

When the rubber composition of the present invention is used in breaker toppings, the combined content of NR and IR based on 100% by mass of the diene rubber component is preferably not less than 70% by mass, and more preferably not less than 75% by mass. Less than 70% by mass tends to result in lower elongation at break. It should be noted that the use of synthetic rubber including 15 to 30% by mass of modified BR and/or modified SBR is advantageous in terms of fuel economy but remarkably reduces elongation at break; therefore, such a composition is used for tires in limited applications under low severity conditions.

When the rubber composition of the present invention is used in band toppings, the combined content of NR and IR based on 100% by mass of the diene rubber component is preferably not less than 50% by mass, and more preferably not less than 60% by mass. Less than 50% by mass tends to result in lower elongation at break and greater reversion. The combined content is preferably not more than 90% by mass, and more preferably not more than 80% by mass. More than 90% by mass tends to result in greater reversion and lower rubber hardness.

The rubber composition of the present invention contains C20 to C32 normal alkanes. This provides good ozone resistance in a temperature range of approximately 0 to 20° C.

The combined amount of C20 to C32 normal alkanes per 100 parts by mass of the diene rubber component is preferably not less than 0.1 parts by mass, and more preferably not less than 0.2 parts by mass. Less than 0.1 parts by mass of the alkanes may not provide sufficient ozone resistance in a temperature range of not higher than 20° C. The combined amount is preferably not more than 2.5 parts by mass, and more preferably not more than 2.3 parts by mass. More than 2.5 parts by mass of the alkanes may result in lower discoloration resistance and lower tackiness during building.

Particularly for use in base treads, the combined amount of C20 to C32 normal alkanes per 100 parts by mass of the diene rubber component is preferably 0.5 to 2.5 parts by mass, and more preferably 0.7 to 2.3 parts by mass. Also, for use in carcass toppings, the combined amount of C20 to C32 normal alkanes per 100 parts by mass of the diene rubber component is preferably 0.1 to 1.5 parts by mass, and more preferably 0.2 to 1.3 parts by mass.

The rubber composition of the present invention typically contains C33 to C44 normal alkanes. This provides good ozone resistance in a temperature range of approximately 40 to 50° C.

The combined amount of C33 to C44 normal alkanes per 100 parts by mass of the diene rubber component is preferably not less than 0.1 parts by mass, and more preferably not less than 0.2 parts by mass. Less than 0.1 parts by mass of the alkanes may not provide sufficient ozone resistance in a temperature range of approximately 40 to 50° C. The combined amount is preferably not more than 2.3 parts by mass, and more preferably not more than 2.1 parts by mass. The use of more than 2.3 parts by mass of C33 to C44 normal alkanes tends to result in a lot of blooms of these alkanes and thus in white discoloration in a temperature range of approximately 40 to 50° C. In particular, it is desirable that the combined amount should be 0.2 to 2.0 parts by mass for use in base treads, and 0.1 to 1.0 parts by mass for use in carcass toppings.

The rubber composition of the present invention typically contains C45 to C47 normal alkanes for the convenience of the purification and production of wax.

The combined amount of C45 to C47 normal alkanes per 100 parts by mass of the diene rubber component is preferably not less than 0.01 parts by mass, and more preferably not less than 0.02 parts by mass. Less than 0.01 parts by mass of the alkanes tend to result in slight deterioration of crack resistance in a temperature range around 60° C. The combined amount is also preferably not more than 0.5 parts by mass, and more preferably not more than 0.15 parts by mass. More than 0.5 parts by mass of the alkanes tend to cause deterioration of resistance to discoloration (white discoloration) in a temperature range around 60° C. In particular, it is desirable that the combined amount should be 0.01 to 0.14 parts by mass for use in base treads, and 0.01 to 0.07 parts by mass for use in carcass toppings.

The rubber composition of the present invention preferably contains not more than 0.1 parts by mass of C48 and higher normal alkanes per 100 parts by mass of the diene rubber component. More than 0.1 parts by mass of the alkanes may cause white discoloration at 60° C. or higher temperatures. The amount of C48 and higher normal alkanes per 100 parts by mass of the diene rubber component is more preferably not more than 0.08 parts by mass.

In the present invention, the combined amount of C25 to C27 normal alkanes per 100 parts by mass of the diene rubber component is preferably not less than 0.02 parts by mass, and more preferably not less than 0.03 parts by mass. Less than 0.02 parts by mass of the alkanes may not provide sufficient ozone resistance in a temperature range around 10° C. The combined amount is preferably not more than 1.5 parts by mass, and more preferably not more than 1.2 parts by mass. More than 1.5 parts by mass of the alkanes tend to cause discoloration. In particular, it is desirable that the combined amount should be 0.20 to 0.80 parts by mass for use in base treads, and 0.03 to 0.40 parts by mass for use in carcass toppings.

The combined amount of C20 to C32 normal alkanes may be controlled to a specific amount, for example, by using a wax containing C20 to C32 normal alkanes.

The wax containing C20 to C32 normal alkanes is not particularly limited, and may be, for example, a wax containing C20 to 55 normal alkanes. Especially, it may suitably be a wax containing, based on 100% by mass thereof, not less than 70% by mass, more suitably not less than 80% by mass of normal alkanes because of their excellent ozone resistance.

The combined content of C20 to C32 normal alkanes based on 100% by mass of the wax is preferably not less than 30% by mass, more preferably not less than 35% by mass, and still more preferably not less than 40% by mass. Waxes with less than 30% by mass of the alkanes may not provide sufficient ozone resistance in a low temperature range of approximately 0 to 20° C. The combined content is preferably not more than 90% by mass, and more preferably not more than 65% by mass. Waxes with more than 90% by mass of the alkanes tend to easily cause white discoloration in a low temperature range of approximately 0 to 20° C.

The content of each of C25 to C27 normal alkanes based on 100% by mass of the wax is preferably not less than 4.1% by mass, and more preferably not less than 5% by mass. Waxes with less than 4.1% by mass each of the alkanes may not sufficiently produce the effect of improving ozone resistance in a temperature range around 10° C. The upper limit of the content is not particularly limited, and is preferably not more than 50% by mass, and more preferably not more than 45% by mass. Waxes with more than 50% by mass of each of the alkanes tend to cause white discoloration in a temperature range around 10° C., and additionally may relatively fail to provide sufficient ozone resistance in a temperature range of approximately 30 to 50° C.

The waxes containing normal alkanes having the carbon number distributions mentioned above can be prepared, for example, by appropriately mixing known waxes.

In the rubber composition of the present invention, the amount of wax per 100 parts by mass of the diene rubber component is preferably not less than 0.1 parts by mass, and more preferably not less than 0.15 parts by mass. Less than 0.1 parts by mass of wax may not provide sufficient ozone resistance. The amount is also preferably not more than 5.0 parts by mass, and more preferably not more than 4.5 parts by mass. More than 5.0 parts by mass of wax may result in lower discoloration resistance.

In particular, for use in base treads, the amount of wax is preferably 0.2 to 5.0 parts by mass, and more preferably 0.2 to 2.5 parts by mass per 100 parts by mass of the diene rubber component. For use in carcass toppings, the amount of wax is preferably 0.1 to 3.0 parts by mass, and more preferably 0.2 to 1.5 parts by mass per 100 parts by mass of the diene rubber component.

The rubber composition of the present invention preferably contains a phenylenediamine antioxidant and/or a quinone antioxidant. The use of the specific antioxidant(s) and the normal alkanes with specific carbon numbers provides excellent ozone resistance over a wide temperature range, and prevents discoloration well. Other antioxidants such as TMQ, on the other hand, can avoid a major discoloration problem because of their own light colors, but they tend not to be effective enough to improve ozone resistance and the like.

Examples of phenylenediamine antioxidants include N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine. Preferred among these is N-(1,3-dimethylbutyl)-N'-phenyl-p-phenylenediamine.

Examples of quinone antioxidants include benzoquinone antioxidants, hydroquinone antioxidants, catechol antioxidants, quinonediimine antioxidants, quinomethane antioxidants, and quinodimethan antioxidants. Preferred among these are quinonediimine antioxidants.

Examples of quinonediimine antioxidants include N-isopropyl-N'-phenyl-p-quinonediimine, N-(1,3-dimethylbutyl)-N'-phenylquinonediimine, N,N'-diphenyl-p-quinonediimine, N-cyclohexyl-N'-phenyl-p-quinonediimine, N-n-hexyl-N'-phenyl-p-quinonediimine, and N,N'-dioctyl-p-quinonediimine. Preferred among these is N-(1,3-dimethylbutyl)-N'-phenylquinonediimine (6QDI).

The combined amount of phenylenediamine and quinone antioxidants is not particularly limited, and they may not be used. When they are used, the combined amount per 100 parts by mass of the diene rubber component is preferably not less than 0.5 parts by mass, and more preferably not less than 1.0 part by mass. Less than 0.5 parts by mass may not provide sufficient resistance to oxidative degradation and sufficient ozone resistance. The combined amount is also preferably not more than 4 parts by mass, and more preferably not more than 3 parts by mass. More than 4 parts by mass tend to cause discoloration (brown discoloration) and cause deterioration of tan δ. For use in base treads, the combined amount is preferably 1.5 to 4 parts by mass. For use in carcass toppings, the combined amount is preferably 0.5 to 2 parts by mass.

The rubber composition of the present invention preferably contains carbon black. This provides a reinforcing effect and a UV-protective effect and thus contributes to achieving the effects of the present invention well.

The carbon black preferably has a nitrogen adsorption specific surface area ($N_2SA$) of not less than 40 $m^2/g$, more preferably not less than 60 $m^2/g$. Carbon black with a $N_2SA$ of less than 40 $m^2/g$ tends not to provide sufficient reinforcement. The $N_2SA$ of carbon black is also preferably not more than 100 $m^2/g$, and more preferably not more than 80 $m^2/g$. The use of carbon black with a $N_2SA$ of more than 100 $m^2/g$ tends to result in a deterioration in rolling resistance.

The nitrogen adsorption specific surface area of carbon black can be determined according to JIS K 6217-2:2001.

In the rubber composition of the present invention, the amount of carbon black is preferably 5 to 100 parts by mass, more preferably 30 to 80 parts by mass, and still more preferably 30 to 65 parts by mass per 100 parts by mass of the diene rubber component, from the viewpoint of the reinforcing effect and the UV-protective effect.

In particular, when the rubber composition of the present invention is used in base treads, the amount of carbon black per 100 parts by mass of the diene rubber component is preferably 10 to 80 parts by mass, and more preferably 30 to 50 parts by mass. For use in carcass toppings, the amount of carbon black per 100 parts by mass of the diene rubber component is preferably 15 to 85 parts by mass, and more preferably 35 to 55 parts by mass. For use in breaker toppings, the amount of carbon black per 100 parts by mass of the diene rubber component is preferably 35 to 70 parts by mass, and more preferably 40 to 65 parts by mass. For use in band toppings, the amount of carbon black per 100 parts by mass of the diene rubber component is preferably 25 to 60 parts by mass, and more preferably 30 to 55 parts by mass. The amount of carbon black falling within each of the ranges mentioned above ensures tensile strength at break TB, elongation at break EB, and crack growth resistance, and therefore resistance to damage in treads, and thus contributes to achieving the effects of the present invention well.

The rubber composition of the present invention may contain silica. This provides good fuel economy.

Examples of silica include, but not limited to, dry silica (anhydrous silica) and wet silica (hydrous silica). Wet silica (hydrous silica), which has more silanol groups, is preferred. When silica is contained, the amount of silica is preferably 5 to 50 parts by mass, and more preferably 10 to 45 parts by mass per 100 parts by mass of the diene rubber component. In the present invention, the use of silica in an amount of 15 parts by mass or more is preferably accompanied by the use of a silane coupling agent.

In the present invention, process oil may be used. Examples of process oil include paraffinic process oils, aromatic process oils, and naphthenic process oils.

The amount of process oil per 100 parts by mass of the diene rubber component is preferably not more than 15 parts by mass. More than 15 parts by mass of process oil tends to serve as a carrier that can migrate together with antioxidants, thus easily causing discoloration. The lower limit of the amount is not particularly limited, and is preferably not less than 2 parts by mass, and more preferably not less than 4 parts by mass. Less than 2 parts by mass of process oil may result in a deterioration in processability. Liquid coumarone-indene resin or liquid BR may be used instead of the oil.

The rubber composition of the present invention may appropriately contain, in addition to the aforementioned components, compounding agents generally used in the preparation of rubber compositions, such as C5 petroleum resin, coumarone-indene resin, an aromatic vinyl polymer obtained by polymerizing α-methylstyrene and/or styrene, stearic acid, zinc oxide, a vulcanizing agent, and a vulcanization accelerator.

The rubber composition of the present invention may be prepared by a known method, for example, such as by kneading the components mentioned above with a rubber kneading device such as an open roll mill and a Banbury mixer, and then vulcanizing the resultant mixture.

The rubber composition of the present invention can be used for any of inner layer components of tires without limitation, and can be suitably used in carcass toppings, breaker toppings, band toppings, base treads, sidewall packings, or inner sidewall layers as described above. The term "sidewall packing" is also called as "soft bead apex", and refers to a component tapering outwardly from a bead apex in the radial direction of a tire. Specifically, it is a component shown in FIG. 1 of JP 2005-271857 A, for instance. The term "inner sidewall layer" is an inner sidewall shown in FIG. 1 of the same publication, for instance.

The pneumatic tire of the present invention can be formed using the rubber composition by a conventional method. Specifically, the unvulcanized rubber composition is extruded into the shape of an inner layer component (e.g. a carcass topping, a breaker topping, a band topping, a base tread, a sidewall packing, an inner sidewall layer, etc.) of a tire, formed in a conventional manner on a tire building machine, and then assembled with other tire components to build an unvulcanized tire. The unvulcanized tire is heated and pressurized in a vulcanizer, thereby producing a tire.

In the case of including a carcass topping made from the rubber composition, the pneumatic tire of the present invention preferably includes sidewalls each having a thickness (in the case of a single-layer sidewall, the thickness thereof; in the case of a double-layer sidewall, the combined thickness of the inner and outer layers) of 1.0 to 2.5 mm. The thickness is preferably not more than 2.3 mm, whereas it is preferably not less than 1.2 mm. When the amount falls within the range mentioned above, good durability, weather resistance, fuel economy, and handling stability can be provided. In the description, the thickness of a sidewall is defined as the minimum distance from the surface of carcass cords to the surface of the sidewall (including the outer thickness of a carcass topping) at the maximum width of a tire.

In the case of including a base tread made from the rubber composition, the pneumatic tire of the present invention preferably has a minimum rubber thickness at the tread groove bottom subtread of 1.0 to 2.5 mm. The minimum thickness is preferably not more than 2.3 mm, whereas it is preferably not less than 1.1 mm. When the amount falls within the range mentioned above, good durability, weather resistance, fuel economy, and handling stability can be provided. The minimum rubber thickness at the tread groove bottom subtread includes all the rubber components including a cap tread, base tread, undertread, breaker topping, and jointless band (JLB) topping, and refers to the minimum distance from the lowest part of the bottom of the grooves to the surface of cords (a jointless breaker, a steel breaker, a fiber breaker).

Examples

The present invention is more specifically described by reference to examples although the present invention is not limited to the examples.

The chemical agents used in the examples and comparative examples are listed below.

Modified BR: BR1250H from ZEON CORPORATION
TSR20: NR (TSR20)
SBR: SBR1502 from JSR Corp.
Carbon black 1: SHOBLACK N330 from Cabot Japan K.K.
Carbon black 2: SHOBLACK N351H from Cabot Japan K.K.
C5 petroleum resin: Marukarez T-100AS from Maruzen Petrochemical Co., Ltd. (C5 petroleum resin: aliphatic petroleum resin formed mainly from olefins and diolefins in C5 fraction obtained by naphtha cracking) (softening point: 102° C.)
Process oil (TDAE): vivatec 500 from H&R
Stearic acid: stearic acid "TSUBAKI" from NOF CORP.
Zinc oxide: Ginrei R from Toho Zinc Co., Ltd.
10% Oil-containing insoluble sulfur: SEIMI sulfur from Nippon Kanryu Industry Co., Ltd. (content of matter insoluble in carbon disulfide: 60%, oil content: 10%)
Vulcanization accelerator (TBBS): NOCCELER NS-G (N-tert-butyl-2-benzothiazolylsulfenamide) from Ouchi Shinko Chemical Industrial Co., Ltd.
Wax 1: Trial product 1 (normal alkane content: 85% by mass on average)
Wax 2: Trial product 2 (normal alkane content: 87% by mass on average)
6PPD: Antigene 6C
(N-(1,3-dimethylbutyl)-N'-phenyl-p-phenylenediamine) from Sumitomo Chemical Co., Ltd.
TMQ: NOCRAC 224 (2,2,4-trimethyl-1,2-dihydroquinoline polymer) from OUCHI SHINKO CHEMICAL INDUSTRIAL CO., LTD.

Figure 1:
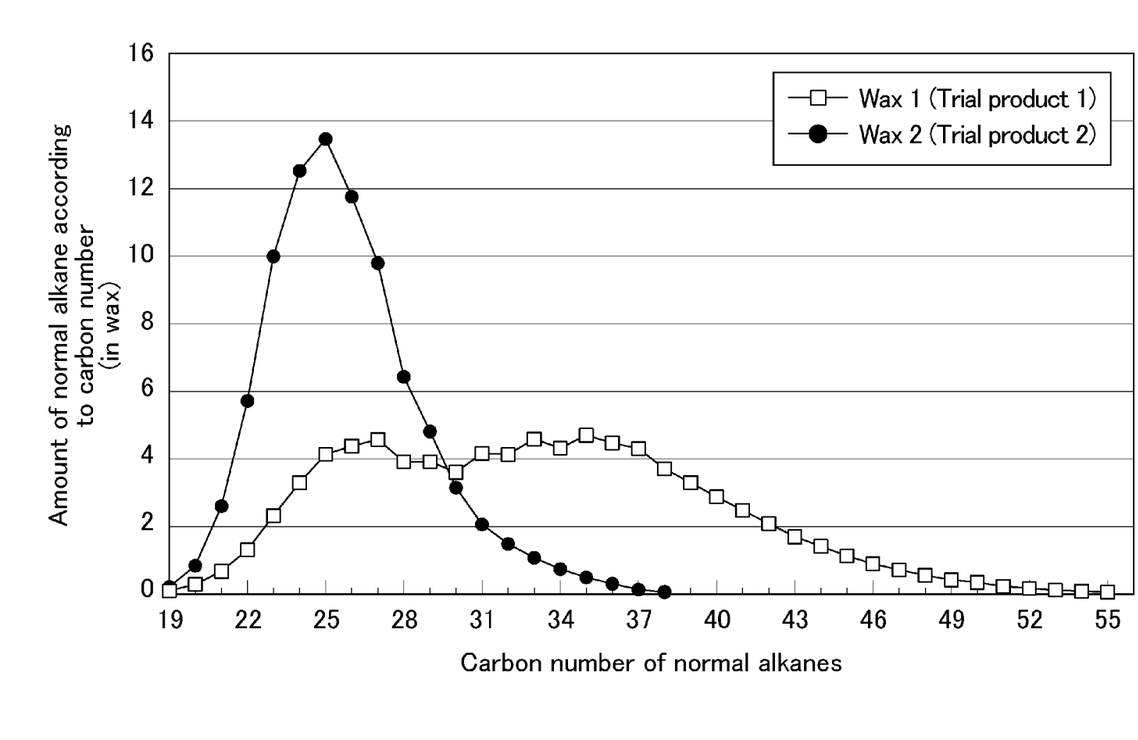
FIG. 1 shows the carbon number distributions of waxes.

The carbon number distribution of the waxes was measured as follows. The results are shown in FIG. 1 and Table 4.

The measurement was performed using a capillary GC as a measuring apparatus and a capillary column coated with aluminum as a column with helium as a carrier gas at a flow rate of 4 mL/minute, a column temperature of 180° C. to 390° C., and a temperature increase rate of 15° C./min.

Examples and Comparative Examples

The chemical agents in formulation amounts shown in the upper columns of Table 1 to 3, except the sulfur and vulcanization accelerator, were kneaded in a 1.7-L Banbury mixer (KOBE STEEL, LTD). Then, the sulfur and vulcanization accelerators were added to the resulting kneaded mixture, and they were kneaded using an open roll mill, thereby providing an unvulcanized rubber composition. Tables 1 and 2 show the compositions for carcass toppings (in Table 2, the compositions of Example 1 and Comparative Example 1 were used and the thickness of the sidewall part of each tire was varied), and Table 3 shows the rubber compositions for base treads (the minimum rubber thickness at the tread groove bottom subtread: 2.0 mm).

The unvulcanized rubber compositions thus prepared were used to prepare components to be formed into a carcass or a base tread, and they were then used to build raw tires. The raw tires were vulcanized at 170° C. to prepare test tires (205/65R15). The test tires were evaluated for their performance by the following tests.

(Crack Test)

Road tests were conducted in the United Arab Emirates in the Middle East in a hot climate for approximately a year (including summer), and in Hokkaido in a boreal climate for approximately a year (including winter). The degree of cracks generated during the tests was evaluated based on the following criteria. A larger number indicates better crack resistance.

(Criteria)
1: A crack or break of 3 mm or more was observed.
2: A deep crack of at least 1 mm but less than 3 mm was observed.
3: A deep and relatively large crack of less than 1 mm was observed.
4: A crack or break was barely visible to the naked eye.
5: A crack or break was not visible to the naked eye, but visible with a magnifier (×10).

(Discoloration Test)
Outdoor: Evaluation of Brown Discoloration

In Kobe, the tires were left outside in the sun for 6 months (from winter to summer). Using a colorimeter, $a^*$ and $b^*$ were measured and the measured values were evaluated on a five-point scale based on the following criteria. A larger number indicates a lower degree of brown discoloration.

(Criteria)
1: $-(a^*+b^*) \times 10 \leq -30$
2: $-30 < -(a^*+b^*) \times 10 \leq -20$
3: $-20 < -(a^*+b^*) \times 10 \leq -10$
4: $-10 < -(a^*+b^*) \times 10 \leq 0$
5: $-(a^*+b^*) \times 10 > 0$ Indoor: Evaluation of White Discoloration In Kobe, the tires were left indoor for 6 months (from winter to summer). Using a colorimeter, $L^*$ was measured and the measured values were evaluated on a five-point scale based on the following criteria. A larger number indicates a lower degree of white discoloration.

(Criteria)
1: $100-L^* \leq 60$
2: $60 < 100-L^* \leq 65$
3: $65 < 100-L^* \leq 70$
4: $70 < 100-L^* \leq 75$
5: $100-L^* > 75$

TABLE 1

(Composition for carcass topping)

|  |  | Com. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Composition (parts by mass) | Modified BR (BR1250H) | 15 | 15 | 15 | 15 | 15 | 15 | 15 | 15 | 15 |
| | TSR20 | 60 | 60 | 60 | 60 | 60 | 60 | 60 | 60 | 60 |
| | SBR (SBR1502) | 25 | 25 | 25 | 25 | 25 | 25 | 25 | 25 | 25 |
| | Carbon black 1 (N330) | 45 | 45 | 45 | 45 | 45 | 45 | 45 | 45 | 45 |
| | C5 petroleum resin (T-100AS) | 2 | 2 | 2 | 2 | 2 | 2 | 2 | 2 | 2 |
| | Process oil (TDAE) | 8 | 8 | 8 | 8 | 8 | 8 | 8 | 8 | 8 |
| | Stearic acid | 2 | 2 | 2 | 2 | 2 | 2 | 2 | 2 | 2 |
| | Zinc oxide | 5 | 5 | 5 | 5 | 5 | 5 | 5 | 5 | 5 |
| | 10% Oil-containing insoluble sulfur | 3 | 3 | 3 | 3 | 3 | 3 | 3 | 3 | 3 |
| | TBBS | 1 | 1 | 1 | 1 | 1 | 1 | 1 | 1 | 1 |
| | Wax 1 (Trial product 1) | 0 | 1 | 1.5 | 1 | 2.5 | 1 | 1 | 0.25 | 0.25 |
| | Wax 2 (Trial product 2) | | | | 0.25 | | | | 1 | |
| | 6PPD | 0.5 | 0.5 | 0.5 | 0.5 | 0.5 | 0 | 1 | 0.5 | 0.5 |
| | TMQ | 0.5 | 0.5 | 0.5 | 0.5 | 0.5 | 0.5 | 0.5 | 0.5 | 0.5 |
| Evaluation | Thickness of SW at maximum width (mm) | 2.2 | 2.2 | 2.2 | 2.2 | 2.2 | 2.2 | 2.2 | 2.2 | 2.2 |
| | Crack test (Hot climate) | 2 | 4 | 4 | 4 | 5 | 3 | 5 | 3 | 3 |
| | Crack test (Boreal climate: Hokkaido) | 2 | 4 | 5 | 5 | 5 | 3+ | 5 | 5 | 3 |
| | Discoloration test (Outdoor: brown discoloration) | 3+ | 4 | 4+ | 4+ | 5 | 4+ | 3 | 4+ | 3+ |
| | Discoloration test (Indoor: white discoloration) | 5 | 4 | 3+ | 4 | 3 | 4 | 4 | 3 | 4 |
| Composition | Wax 1 (Trial product 1) | 0 | 1 | 1.5 | 1 | 2.5 | 1 | 1 | 0.25 | 0.25 |
| | Wax 2 (Trial product 2) | | | | 0.25 | | | | 1 | |
| | Total | | 1 | 1.5 | 1.25 | 2.5 | 1 | 1 | 1.25 | 0.25 |
| | Amount of C20 to C32 normal alkanes (40.7% by mass): Wax 1 | | 0.41 | 0.61 | 0.41 | 1.02 | 0.41 | 0.41 | 0.10 | 0.10 |
| | Amount of C20 to C32 normal alkanes (84.6% by mass): Wax 2 | | | | 0.21 | | | | 0.85 | |
| | Amount of C20 to C32 normal alkanes: Total | | 0.41 | 0.61 | 0.62 | 1.02 | 0.41 | 0.41 | 0.95 | 0.10 |
| | Amount of C33 to C44 normal alkanes (40.0% by mass): Wax 1 | | 0.40 | 0.60 | 0.40 | 1.00 | 0.40 | 0.40 | 0.10 | 0.10 |
| | Amount of C33 to C44 normal alkanes (2.8% by mass): Wax 2 | | | | 0.01 | | | | 0.03 | |
| | Amount of C33 to C44 normal alkanes: Total | | 0.40 | 0.60 | 0.41 | 1.00 | 0.40 | 0.40 | 0.13 | 0.10 |
| | Amount of C45 to C47 normal alkanes (2.75% by mass): Wax 1 | | 0.03 | 0.04 | 0.03 | 0.07 | 0.03 | 0.03 | 0.01 | 0.01 |
| | Amount of C45 to C47 normal alkanes: Total | | 0.03 | 0.04 | 0.03 | 0.07 | 0.03 | 0.03 | 0.01 | 0.01 |
| | Amount of C48 and higher normal alkanes (2% by mass): Wax 1 | | 0.02 | 0.03 | 0.02 | 0.05 | 0.02 | 0.02 | 0.01 | 0.01 |
| | Amount of C48 and higher normal alkanes: Total | | 0.02 | 0.03 | 0.02 | 0.05 | 0.02 | 0.02 | 0.01 | 0.01 |
| | Amount of C25 to C27 normal alkanes (13.1% by mass): Wax 1 | | 0.13 | 0.20 | 0.13 | 0.33 | 0.13 | 0.13 | 0.03 | 0.03 |
| | Amount of C25 to C27 normal alkanes (35.0% by mass): Wax 2 | | | | 0.09 | | | | 0.35 | |
| | Amount of C25 to C27 normal alkanes: Total | | 0.13 | 0.20 | 0.22 | 0.33 | 0.13 | 0.13 | 0.38 | 0.03 |

TABLE 2

(Composition for carcass topping)

| | | Ex. 9 | Ex. 10 | Ex. 1 | Ex. 11 | Ex. 12 | Com. Ex. 2 | Com. Ex. 3 | Com. Ex. 1 | Com. Ex. 4 | Com. Ex. 5 |
|---|---|---|---|---|---|---|---|---|---|---|---|
| Composition (parts by mass) | Modified BR (BR1250H) | 15 | 15 | 15 | 15 | 15 | 15 | 15 | 15 | 15 | 15 |
| | TSR20 | 60 | 60 | 60 | 60 | 60 | 60 | 60 | 60 | 60 | 60 |
| | SBR (SBR1502) | 25 | 25 | 25 | 25 | 25 | 25 | 25 | 25 | 25 | 25 |
| | Carbon black 1 (N330) | 45 | 45 | 45 | 45 | 45 | 45 | 45 | 45 | 45 | 45 |
| | C5 petroleum resin (T-100AS) | 2 | 2 | 2 | 2 | 2 | 2 | 2 | 2 | 2 | 2 |
| | Process oil (TDAE) | 8 | 8 | 8 | 8 | 8 | 8 | 8 | 8 | 8 | 8 |
| | Stearic acid | 2 | 2 | 2 | 2 | 2 | 2 | 2 | 2 | 2 | 2 |
| | Zinc oxide | 5 | 5 | 5 | 5 | 5 | 5 | 5 | 5 | 5 | 5 |
| | 10% Oil-containing insoluble sulfur | 3 | 3 | 3 | 3 | 3 | 3 | 3 | 3 | 3 | 3 |
| | TBBS | 1 | 1 | 1 | 1 | 1 | 1 | 1 | 1 | 1 | 1 |
| | Wax 1 (Trial product 1) | 1 | 1 | 1 | 1 | 1 | 0 | 0 | 0 | 0 | 0 |
| | Wax 2 (Trial product 2) | | | | | | | | | | |
| | 6PPD | 0.5 | 0.5 | 0.5 | 0.5 | 0.5 | 0.5 | 0.5 | 0.5 | 0.5 | 0.5 |
| | TMQ | 0.5 | 0.5 | 0.5 | 0.5 | 0.5 | 0.5 | 0.5 | 0.5 | 0.5 | 0.5 |
| Evaluation | Thickness of SW at maximum width (mm) | 1.2 | 1.7 | 2.2 | 3 | 4 | 1.2 | 1.7 | 2.2 | 3 | 4 |
| | Crack test (Hot climate) | 4 | 4 | 4 | 4 | 5 | 1 | 2 | 2 | 2 | 3 |
| | Crack test (Boreal climate: Hokkaido) | 4− | 4 | 4 | 4+ | 5 | 1 | 2 | 2 | 2 | 3 |
| | Discoloration test (Outdoor: brown discoloration) | 4 | 4 | 4 | 4+ | 5 | 2 | 3 | 3+ | 3+ | 4 |
| | Discoloration test (Indoor: white discoloration) | 4− | 4 | 4 | 4 | 3+ | 5 | 5 | 5 | 4 | 3+ |

TABLE 3

(Composition for base tread)

| | | Com. Ex. 6 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| Composition (parts by mass) | Modified BR (BR1250H) | 25 | 25 | 25 | 25 | 25 | 25 | 25 | 25 | 25 |
| | TSR20 | 75 | 75 | 75 | 75 | 75 | 75 | 75 | 75 | 75 |
| | Carbon black 2 (N351H) | 40 | 40 | 40 | 40 | 40 | 40 | 40 | 40 | 40 |
| | C5 petroleum resin (T-100AS) | 2 | 2 | 2 | 2 | 2 | 2 | 2 | 2 | 2 |
| | Process oil (TDAE) | 5 | 5 | 5 | 5 | 5 | 5 | 5 | 5 | 5 |
| | Stearic acid | 2 | 2 | 2 | 2 | 2 | 2 | 2 | 2 | 2 |
| | Zinc oxide | 5 | 5 | 5 | 5 | 5 | 5 | 5 | 5 | 5 |
| | 10% Oil-containing insoluble sulfur | 2.22 | 2.22 | 2.22 | 2.22 | 2.22 | 2.22 | 2.22 | 2.22 | 2.22 |
| | TBBS | 1.5 | 1.5 | 1.5 | 1.5 | 1.5 | 1.5 | 1.5 | 1.5 | 1.5 |
| | Wax 1 (Trial product 1) | 0 | 2 | 3 | 2 | 5 | 2 | 2 | 0.5 | 1.8 |
| | Wax 2 (Trial product 2) | | | | 0.5 | | | | 2 | |
| | 6PPD | 2.4 | 2.4 | 2.4 | 2.4 | 2.4 | 1.5 | 4 | 2.4 | 2.4 |
| | TMQ | 0.5 | 0.5 | 0.5 | 0.5 | 0.5 | 0.5 | 0.5 | 0.5 | 0.5 |
| Evaluation | Crack test (Hot climate) | 2 | 4 | 4 | 4 | 5 | 3 | 5 | 3 | 3 |
| | Crack test (Boreal climate: Hokkaido) | 2 | 4 | 5 | 5 | 5 | 3+ | 5 | 5 | 3 |
| | Discoloration test (Outdoor: brown discoloration) | 3+ | 4 | 4+ | 4+ | 5 | 4+ | 3 | 4+ | 3+ |
| | Discoloration test (Indoor: white discoloration) | 5 | 4 | 3+ | 4 | 3 | 4 | 4 | 3 | 4 |
| Composition | Wax 1 (Trial product 1) | 0 | 2 | 3 | 2 | 5 | 2 | 2 | 0.5 | 1.8 |
| | Wax 2 (Trial product 2) | | | | 0.5 | | | | 2 | |
| | Total | | 2 | 3 | 2.5 | 5 | 2 | 2 | 2.5 | 1.8 |
| | Amount of C20 to C32 normal alkanes (40.7% by mass): Wax 1 | | 0.81 | 1.22 | 0.81 | 2.04 | 0.81 | 0.81 | 0.20 | 0.73 |
| | Amount of C20 to C32 normal alkanes (84.6% by mass): Wax 2 | | | | 0.42 | | | | 1.69 | |
| | Amount of C20 to C32 normal alkanes: Total | | 0.81 | 1.22 | 1.24 | 2.04 | 0.81 | 0.81 | 1.90 | 0.73 |
| | Amount of C33 to C44 normal alkanes (40.0% by mass): Wax 1 | | 0.80 | 1.20 | 0.80 | 2.00 | 0.80 | 0.80 | 0.20 | 0.72 |
| | Amount of C33 to C44 normal alkanes (2.8% by mass): Wax 2 | | | | 0.01 | | | | 0.06 | |
| | Amount of C33 to C44 normal alkanes: Total | | 0.80 | 1.20 | 0.81 | 2.00 | 0.80 | 0.80 | 0.26 | 0.72 |
| | Amount of C45 to C47 normal alkanes (2.75% by mass): Wax 1 | | 0.06 | 0.08 | 0.06 | 0.14 | 0.06 | 0.06 | 0.01 | 0.05 |
| | Amount of C45 to C47 normal alkanes: Total | | 0.06 | 0.08 | 0.06 | 0.14 | 0.06 | 0.06 | 0.01 | 0.05 |
| | Amount of C48 and higher normal alkanes (2% by mass): Wax 1 | | 0.04 | 0.06 | 0.04 | 0.10 | 0.04 | 0.04 | 0.01 | 0.04 |

TABLE 3-continued (Composition for base tread)

|  | Com. Ex. 6 | Ex. 13 | Ex. 14 | Ex. 15 | Ex. 16 | Ex. 17 | Ex. 18 | Ex. 19 | Ex. 20 |
|---|---|---|---|---|---|---|---|---|---|
| Amount of C48 and higher normal alkanes: Total |  | 0.04 | 0.06 | 0.04 | 0.10 | 0.04 | 0.04 | 0.01 | 0.04 |
| Amount of C25 to C27 normal alkanes (13.1% by mass): Wax 1 |  | 0.26 | 0.39 | 0.26 | 0.66 | 0.26 | 0.26 | 0.07 | 0.24 |
| Amount of C25 to C27 normal alkanes (35.0% by mass): Wax 2 |  |  |  | 0.18 |  |  |  | 0.70 |  |
| Amount of C25 to C27 normal alkanes: Total |  | 0.26 | 0.39 | 0.44 | 0.66 | 0.26 | 0.26 | 0.77 | 0.24 |

TABLE 4

|  |  | Amount of normal alkane according to carbon number (in wax) | |
|---|---|---|---|
|  |  | Wax 1 (Trial product 1) | Wax 2 (Trial product 2) |
| Carbon number of normal alkanes | 19 | 0.1 | 0.21 |
|  | 20 | 0.29 | 0.84 |
|  | 21 | 0.68 | 2.60 |
|  | 22 | 1.31 | 5.72 |
|  | 23 | 2.32 | 10.00 |
|  | 24 | 3.3 | 12.52 |
|  | 25 | 4.14 | 13.46 |
|  | 26 | 4.38 | 11.76 |
|  | 27 | 4.58 | 9.80 |
|  | 28 | 3.92 | 6.43 |
|  | 29 | 3.92 | 4.81 |
|  | 30 | 3.61 | 3.15 |
|  | 31 | 4.16 | 2.06 |
|  | 32 | 4.13 | 1.49 |
|  | 33 | 4.59 | 1.08 |
|  | 34 | 4.32 | 0.74 |
|  | 35 | 4.7 | 0.50 |
|  | 36 | 4.47 | 0.31 |
|  | 37 | 4.31 | 0.14 |
|  | 38 | 3.71 | 0.06 |
|  | 39 | 3.3 |  |
|  | 40 | 2.88 |  |
|  | 41 | 2.48 |  |
|  | 42 | 2.09 |  |
|  | 43 | 1.7 |  |
|  | 44 | 1.42 |  |
|  | 45 | 1.13 |  |
|  | 46 | 0.9 |  |
|  | 47 | 0.72 |  |
|  | 48 | 0.56 |  |
|  | 49 | 0.42 |  |
|  | 50 | 0.35 |  |
|  | 51 | 0.23 |  |
|  | 52 | 0.17 |  |
|  | 53 | 0.12 |  |
|  | 54 | 0.09 |  |
|  | 55 | 0.06 |  |
| Amount of C20 to C32 normal alkanes (% by mass) |  | 40.74 | 84.64 |
| Amount of C33 to C44 normal alkanes (% by mass) |  | 39.97 | 2.83 |
| Amount of C45 to C47 normal alkanes (% by mass) |  | 2.75 |  |
| Amount of C48 and higher normal alkanes (% by mass) |  | 2.00 |  |
| Amount of C25 to C27 normal alkanes (% by mass) |  | 13.10 | 35.02 |
| Amount of iso-components (% by mass) |  | 14.44 | 12.32 |

In the examples using C20 to C32 normal alkanes, excellent ozone resistance was achieved over a wide environmental temperature range, and discoloration was well prevented.

The invention claimed is:

1. A carcass topping comprising a rubber composition for tire inner layers, said rubber composition having a combined amount of C20 to C32 normal alkanes of 0.1 to 2.5 parts by mass, a combined amount of phenylenediamine and quinone antioxidants of 0 to 4 parts by mass, a combined amount of C45 to C47 normal alkanes of 0.01 to 0.5 parts by mass, and an amount of C48 and higher normal alkanes of 0 to 0.08 parts by mass, each per 100 parts by mass of a diene rubber component of the rubber composition,
    wherein
    a styrene-butadiene rubber content is 10 to 45% by mass, a polybutadiene rubber content is 0 to 40% by mass, and a combined content of natural rubber and polyisoprene rubber is 40 to 80% by mass, each based on 100% by mass of the diene rubber component, and
    an amount of carbon black is 15 to 85 parts by mass per 100 parts by mass of the diene rubber component.

2. The carcass topping according to claim 1, wherein a combined amount of C33 to C44 normal alkanes is 0.1 to 2.3 parts by mass per 100 parts by mass of the diene rubber component.

3. The carcass topping according to claim 1, wherein a combined amount of C25 to C27 normal alkanes is 0.02 to 1.5 parts by mass per 100 parts by mass of the diene rubber component.

4. The carcass topping according to claim 1, further comprising 0 to 15 parts by mass of process oil per 100 parts by mass of the diene rubber component.

5. The carcass topping according to claim 1, further comprising 5 to 100 parts by mass of carbon black per 100 parts by mass of the diene rubber component.

6. A base tread comprising a rubber composition for tire inner layers, said rubber composition having a combined amount of C20 to C32 normal alkanes of 0.1 to 2.5 parts by mass, a combined amount of phenylenediamine and quinone antioxidants of 0 to 4 parts by mass, a combined amount of C45 to C47 normal alkanes of 0.01 to 0.5 parts by mass, and an amount of C48 and higher normal alkanes of 0 to 0.08 parts by mass, each per 100 parts by mass of a diene rubber component of the rubber composition,
    wherein
    a polybutadiene rubber content is 10 to 50% by mass and a combined content of natural rubber and polyisoprene rubber is 50 to 90% by mass, each based on 100% by mass of the diene rubber component, and
    an amount of carbon black is 10 to 80 parts by mass per 100 parts by mass of the diene rubber component.

7. A pneumatic tire, comprising:
    a carcass topping according to claim 1; and
    sidewalls each having a thickness of 1.0 to 2.5 mm.

8. A pneumatic tire, comprising
a base tread according to claim 6,
the pneumatic tire having a minimum rubber thickness at a tread groove bottom subtread of 1.0 to 2.5 mm.

* * * * *